Aug. 19, 1958
M. L. BENJAMIN ET AL
2,847,882
RECESSING TOOL
Filed Feb. 23, 1956
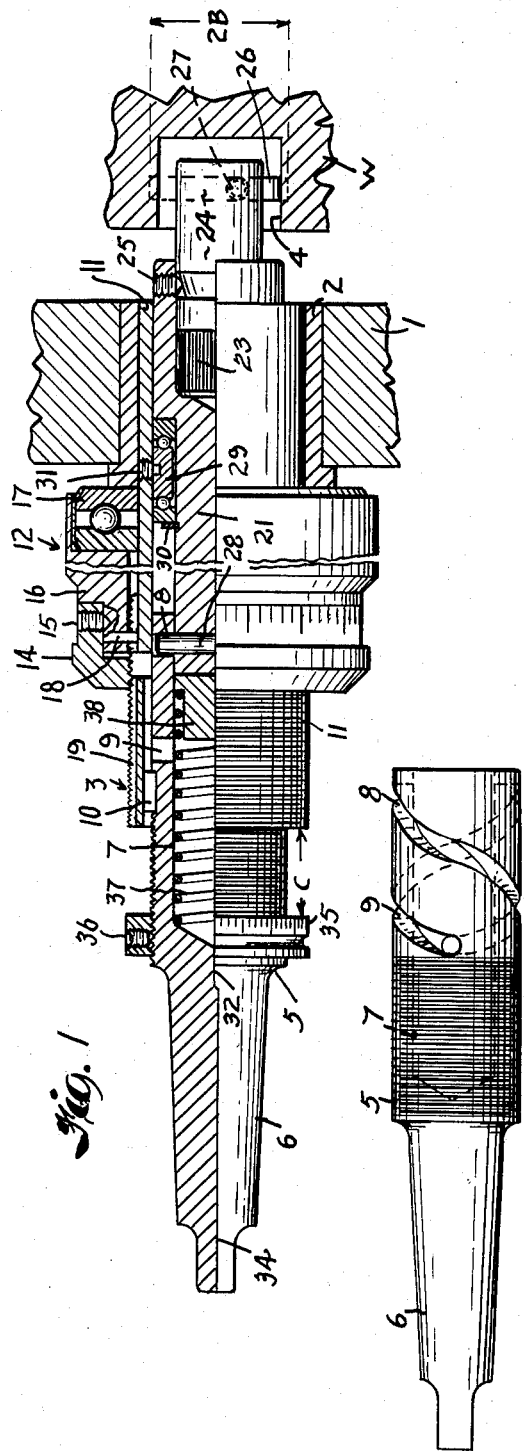
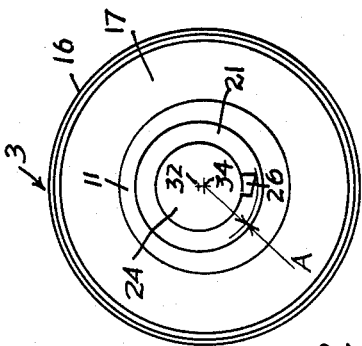
INVENTORS
MILTON L. BENJAMIN AND
BY FRANKLYN F. WINNEN
Oberlin + Limbach
ATTORNEYS.

United States Patent Office 2,847,882
Patented Aug. 19, 1958

2,847,882

RECESSING TOOL

Milton L. Benjamin and Franklyn E. Winnen, Cleveland, Ohio, assignors to Erickson Tool Company, Cleveland, Ohio, a corporation of Ohio Application February 23, 1956, Serial No. 567,367

2 Claims. (Cl. 77—58)

The present invention relates generally as indicated to a recessing tool for forming an annular recess or undercut in a drilled or bored hole of a workpiece.

The present invention relates to that general type of recessing tool in which a rotating cutter, in radially retracted position, is first inserted in the hole of a workpiece and then is shifted radially outwardly to cutting position to form an annular recess in the workpiece as the cutting edge of the cutter moves in a circular path which is coaxial with the workpiece hole.

One known way of effecting such radial movement of the cutter from retracted to cutting position is to provide helical slots through the shank of an eccentrically disposed cutter mounting member, rotation of said member with respect to the body of the tool being effected by axial movement of a cross pin carried by said body and engaged in the helical slots of said cutter mounting member.

Accordingly, axial movement of said body with respect to said cutter mounting member effects rotation of the latter to thus shift the cutter thereof radially outward to cut an annular recess or undercut, as aforesaid, in the surrounding workpiece.

As evident, in a recessing tool of this known type, the shank of the cutter mounting member will be greatly weakened by the formation of the helical slots therethrough, and consequently said member will have undesired lateral and torsional flexibility whereby, when the cutter engages the work, it may chatter and said member may twist and thereby tend to close the slots with resulting binding on said cross pin.

With this known type of recessing tool, frequent breakage has been encountered which is not only expensive from the standpoint of cost of replacement, but also from the standpoint of production loss resulting from machine shut-down.

It is one principal object of this invention to provide a recessing tool in which the cutter mounting member is strong and relatively inflexible laterally and torsionally by reason of formation of the helical turning slots in the substantially larger diameter, heavy-wall thickness body member which surrounds the shank of the cutter mounting member.

It is another object of this invention to provide a recessing tool in which the torque transmitted from the body to the cutter mounting member is ineffective to tend to close the helical turning slots.

It is another object of this invention to provide a pin and helical slot connection between the tool body and the cutter mounting member in which the slots are of greater than 180° extent to prevent deformation or breakage of any parts of the tool in instances where the workpiece is not formed with a hole or where such hole is not of the required depth, the extra slot length permitting axial movement of the body and machine tool spindle even though a locating abutment or stop member of the tool has not reached its stop position due to the end of the cutter mounting member bottoming against a defective workpiece.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail a certain illustrative embodiment of the invention, this being indicative, however, of but one of a few of the various ways in which the principle of the invention may be employed.

In said annexed drawing:

Fig. 1 is a quarter section taken longitudinally of one form of the recessing tool constituting the present invention;

Fig. 2 is an end elevation view of the recessing tool as viewed from the righthand end of Fig. 1;

Fig. 3 is an elevation view of the helically slotted recessing tool body; and

Fig. 4 is an elevation view similar to Fig. 2 except that the cutter has been shifted from the retracted position of Figs. 1 and 2 to operating position to form an undercut or recess in the workpiece.

Referring now more specifically to the recessing tool disclosed herein, the reference numeral 1 denotes a fixed part of a machine tool provided with a guide bushing 2, of which one end, as shown, constitutes a stop shoulder for the recessing tool 3.

The bored or drilled workpiece W which is to be recessed is suitably held in a chuck (not shown) adjacent the fixed part 1. Said workpiece W is chucked so that the axis of the hole 4 therein is coaxial with the bushing 2 aforesaid and with the lefthand, driving end of the tool 3.

The recessing tool 3 herein comprises a body member 5 which is provided at one end with a tapered shank 6 or the like which is adapted to be wedged, in well known manner, in the rotating and axially movable spindle of a machine tool. Thus, said body member 5 is adapted to be driven by and axially moved by the machine tool spindle.

The other coaxial and cylindrical end of said body member 5 is formed with a bore 7 which is disposed eccentrically with respect to the shank 6. A pair of diametrically opposite helical slots 8 and 9 extend through the wall of said cylindrical end of said body member 5.

Said body member 5 is axially slidably keyed by means of the key 10 in a tubular pilot 11, the front or right end of which preferably is a sliding fit in the foresaid bushing 2. Axially adjustable on said pilot 11 is a thrust bearing assembly 12 which is moved axially by rotating the nut 14 which is in threaded engagement with said pilot 11, said nut 14 being provided with a set screw 15 which is engaged in the peripheral groove of the bearing housing 16 and which, when slightly loosened, permits turning of said nut 14 and consequent axial movement of housing 16 along pilot 11.

The thrust bearing 17 is retained in housing 16 and has one race adapted to abut the left end of the bushing 2, as shown in Fig. 1, when the recessing tool 3 is brought into operating position ready to form an undercut in the workpiece W. The bearing housing 16 is slidably keyed to the pilot 11 as by means of the pin 18 which engages a longitudinally extending keyway 19 in the pilot 11. The nut 14 aforesaid is preferably formed with graduations, as shown, which cooperate with a mark on the bearing housing 16 to enable accurate positioning of the recessing tool axially with respect to the hole 4 in the workpiece W.

Telescoped in the aforesaid eccentric bore 7 of said body 6 and an eccentric bore in the pilot 11 is the solid shank of the cutter mounting member 21, which is formed with a splined bore 23 in which the cutter mount 24 is non-rotatably fitted in any desired rotary position, said mount 24 being locked in place in member 21 as by means of the set screw 25. The aforesaid mount 24 is herein shown as mounting a tool bit 26 in a transverse bore thereof. The tool bit 26 projects radially and is held in place by set screw 27. Obviously, a circular form tool or the like may be substituted.

The shank end of the cutter mounting member 21 that fits in the bore 7 of the body 5 has pressed therein a diametrically extending pin 28, the ends of which engage in the respective helical slots 8 and 9 of said body 5. Said cutter mounting member 21 has a double row thrust bearing 29 mounted thereon between the shoulder thereof and snap ring 30, said member 21 and pilot 11 being held against relative axial movement by set screw 31 engaged in the middle race of said double thrust bearing 29. Said bearing 29 permits free turning of member 21 through the pin 28 and helical slot 8—9 connection as the body member 5 is axially moved.

It can now be seen that, when the parts of the recessing tool 3 are positioned as shown in Figs. 1 and 2, that is, with the machine tool spindle having been fed toward the right so that the pilot 11 enters bushing 2 and so that the exposed race of the thrust bearing 17 abuts the left end of the bushing 2, and in this position, the tool bit 26 will be located at the proper axial position in the hole 4 of the workpiece W.

Now, upon continued axial movement of the spindle and of the body 5 toward the right as viewed in Fig. 1, the cutter mounting member 21 together with the mount 24 and the tool bit 26 will be caused to rotate relative to the body 5 about the axis 32 of the bore 6 and of the bore in the righthand end of pilot 11 to thus progressively shift the bit 26 radially outward with respect to the axis 34 of the shank 6, of the outside diameter of pilot 11, and of the hole 4 of the workpiece W.

Now, as the cutting lip of cutter 26 moves in an orbit about axis 34, it will cut an undercut of diameter 2B (see Figs. 1 and 4) whereas in Fig. 2 the cutter tip describes a circle of less diameter 2A about axis 34.

Accordingly, the cutting tool 26 engages the wall of the bore 4 in the workpiece W and forms an annular recess therein which is of the desired diameter 2B, the recess being shown in dotted lines in Fig. 1.

Should it be desired to adjust the diameter 2B of the recess or undercut, the body 5 may have threaded thereon a nut 35 which, when rotated, may be moved toward or away from the lefthand end of the tubular pilot 11, and in this way the cutter mounting member 21 may be rotated any desired degree through slot 8—9 and pin 28 connection as determined by the adjusted distance C. A set screw 36 locks the nut 35 in desired position.

From the foregoing description, it is clear that the cutter mounting assembly consisting of the parts 21 and 24 is solid and strong and effectively resists bending by lateral forces and twisting by torsional forces. In fact, there is no tendency of closing of the helical slots 8—9 to bind on the ends of the pin 28. Moreover, the helical slots 8—9 being on the substantially larger diameter body member 5 impart strength not obtainable by equivalent slots formed in the interior member of relatively telescoped members.

The maximum throw of the cutting tool 26 occurs 180° or one-half turn from the innermost position of the tool; and, therefore, any rotation beyond 180° will cause the cutting tool 26 to be pulled inwardly relative to the recessing tool axis 34.

In the present case, the helical slots 8—9 are each of greater than 180° extent and one main reason for so making the slots is to prevent tool breakage in the event that a defective workpiece W has no drilled hole 4 or has a drilled hole 4 of insufficient depth.

In such event (nut 35 omitted), the end of the part 24 would engage the workpiece W before the bearing 17 would engage the bushing 2, but, by providing the extra length of helical slots, the machine tool spindle and body 5 may nevertheless partake of its regular feed stroke even though the feed movement of the cutter mounting assembly has been prematurely arrested by the defective workpiece.

When a defective workpiece as aforesaid is chucked in the machine for recessing, the body 5 merely continues its axial movement with respect to the cutter mounting assembly which prematurely abuts the defective workpiece, and the only thrust load between the aforesaid workpiece is that due to the spring 37 which is disposed in the body and which exerts axial force, through the button 38, against the end of the cutter mounting member 21.

Said spring 37, as evident, serves to automatically retract the cutting tool 26 to the Figs. 1 and 2 position when the machine tool spindle and body member 5 are retracted axially toward the left after the recess has been formed in the workpiece W, said spring 37 being operative through the pin 28 engaged in the helical slots 8—9 to turn the cutter mounting members 21 and 24 back to the initial retracted condition shown in Figs. 1 and 2.

After the workpiece W has been formed with the desired recess of diameter 2B, the recessing tool 3 may be axially retracted a desired distance to permit removal of the finished workpiece and chucking of the next workpiece W for repetition of the operations aforesaid.

The adjusting nut 35 aforesaid, when used for adjusting the diameter of the recess formed in the workpiece W, may be provided with peripheral graduations, as shown, to cooperate with a mark which is on the threaded portion of the body 5 or else a mark on the tubular pilot 11 against which said nut abuts. In this way, accurate adjustments may be made.

However, it is preferred to omit nut 35, and, instead, adjust the total feed stroke of the spindle and body 5 so that, first the bearing 17 moves a certain distance to abut bushing 2, leaving a predetermined axial distance for turning the cutter mounting member 21 through a predetermined amount about axis 32.

Other modes of applying the principle of the invention may be employed, change being made as regards the details described, provided the features stated in any of the following claims, or the equivalent of such, be employed.

We therefore particularly point out and distinctly claim as our invention:

1. A recessing tool comprising a coaxial body member and tubular pilot that are keyed together for rotation in unison and for axially sliding of one end of said body member within one end of said pilot, said body member at its other end being fashioned for connection with a rotary drive and axial feed spindle, and said pilot at its other end being fashioned to enter a stationary guide bushing whereby said body member and said pilot are supported for rotation about the common central axis thereof, stop means axially adjustably mounted on said pilot for abutting engagement with such guide bushing to arrest axial feeding movement of said pilot while said body member continues to be moved axially, such one end of said body member and said pilot respectively being formed with eccentrically disposed bores having an axis that is parallel to the central axis of rotation of said body member and said pilot, a cutter mounting member axially fixedly mounted in said pilot and rotatably supported in such eccentrically disposed bores, the bore of said body member being intersected by diametrically opposite helical slots, said cutter mounting member having radial projections engaged in such slots whereby said cutter mounting member is turned responsive to relative axial movement of said body member and of said pilot and cutter mounting member, a cutter affixed to said cutter mounting member for movement in a spiral path with respect to the axis of rotation of said body member and said pilot when said cutter mounting member is thus turned about the axis of such eccentric bores, such cutter, prior to turning of said cutter mounting member as aforesaid, being adapted to be disposed within an opening of a workpiece to be recessed and, during movement in such spiral path and while said body, said pilot, and said cutter mounting member are rotated about such central axis, being adapted to form a recess in the workpiece, the engagement of said helical slots and projections constituting the sole torque transmitting means between said body member and said cutter mounting member.

2. The recessing tool of claim 1 wherein said helical slots extend beyond said projections to permit a predetermined axial advance of said body member by the spindle even though the cutter confronts a defective workpiece that has no opening for entry of the cutter therewithin.

References Cited in the file of this patent

UNITED STATES PATENTS 2,182,770     Woodcock  --------------- Dec. 5, 1939